United States Patent
Takeda et al.

(10) Patent No.: US 8,339,111 B2
(45) Date of Patent: Dec. 25, 2012

(54) REACTIVE POWER COMPENSATOR

(75) Inventors: Masatoshi Takeda, Osaka (JP); Shinichi Ogusa, Tokyo (JP)

(73) Assignee: Mitsubishi Electric Corporation, Chiyoda-Ku; Tokyo (JP)

( * ) Notice: Subject to any disclaimer, the term of this patent is extended or adjusted under 35 U.S.C. 154(b) by 381 days.

(21) Appl. No.: 12/724,610

(22) Filed: Mar. 16, 2010

(65) Prior Publication Data

US 2010/0237835 A1 Sep. 23, 2010

(30) Foreign Application Priority Data

Mar. 18, 2009 (JP) ................................ 2009-065925
Dec. 15, 2009 (JP) ................................ 2009-283860

(51) Int. Cl.
G05F 1/70 (2006.01)

(52) U.S. Cl. ..................................................... 323/211

(58) Field of Classification Search ........... 323/205–211
See application file for complete search history.

(56) References Cited

U.S. PATENT DOCUMENTS

| | | | | |
|---|---|---|---|---|
| 3,963,978 A | * | 6/1976 | Kelley et al. ................. | 323/210 |
| 4,571,535 A | * | 2/1986 | Gyugyi ......................... | 323/211 |
| 4,719,402 A | * | 1/1988 | Brennen et al. ............... | 323/211 |
| 4,752,726 A | * | 6/1988 | Aoyama ....................... | 323/207 |
| 5,548,203 A | * | 8/1996 | Kemerer et al. .............. | 323/210 |
| 5,631,545 A | * | 5/1997 | Norman et al. ............... | 323/205 |
| 5,684,389 A | * | 11/1997 | Tyll et al. ...................... | 323/209 |
| 7,183,752 B2 | * | 2/2007 | Horger et al. ................. | 323/211 |
| 7,688,043 B2 | * | 3/2010 | Toki et al. ..................... | 323/210 |
| 7,755,333 B2 | * | 7/2010 | Yasuda et al. ................. | 323/210 |
| 2009/0001942 A1 | * | 1/2009 | Temma et al. ................ | 323/211 |

FOREIGN PATENT DOCUMENTS

| | | |
|---|---|---|
| JP | 54-11452 A | 1/1979 |
| JP | 58-218831 A | 12/1983 |
| JP | 59-101424 U | 7/1984 |
| JP | 59-183145 U | 12/1984 |

* cited by examiner

Primary Examiner — Adolf Berhane
(74) Attorney, Agent, or Firm — Buchanan Ingersoll & Rooney PC

(57) ABSTRACT

A capacitor bank unit includes three capacitor banks that have respective capacitances that are multiples of a basic capacitance in accordance with a number sequence of the n-th power of 2. One of the capacitor banks has the basic capacitance, remaining two of the capacitor banks includes two subbanks each. The capacitance of a subbank is set to a capacitance that is a multiple of the basic capacitance in accordance with a number sequence of the m-th power of 2. When any one of the capacitor banks fails, each of capacitor banks following the failed capacitor bank substitutes for a capacitor bank located immediately before itself.

18 Claims, 9 Drawing Sheets

|  | NO FAILURE | FAILURE OF CAPACITOR BANK 31 | FAILURE OF CAPACITOR BANK 32 | FAILURE OF CAPACITOR BANK 33 |
|---|---|---|---|---|
| THYRISTOR SW 16 | CONTROL WITH SIGNAL B1 | (NO CONTROL) | CONTROL WITH SIGNAL B1 | CONTROL WITH SIGNAL B1 |
| THYRISTOR SW 17 | CONTROL WITH SIGNAL B2 | CONTROL WITH SIGNAL B1 | (NO CONTROL) | CONTROL WITH SIGNAL B2 |
| THYRISTOR SW 18 | CONTROL WITH SIGNAL B3 | CONTROL WITH SIGNAL B2 | CONTROL WITH SIGNAL B2 | (NO CONTROL) |

FIG.4

| | NO FAILURE | FAILURE OF CAPACITOR BANK 31 | FAILURE OF CAPACITOR BANK 32 | FAILURE OF CAPACITOR BANK 33 |
|---|---|---|---|---|
| SWITCH 1 | ON | OFF | ON | ON |
| SWITCH 2a | ON | ON | OFF | ON |
| SWITCH 2b | ON | OFF | OFF | ON |
| SWITCH 3a | ON | ON | ON | OFF |
| SWITCH 3b | ON | OFF | OFF | OFF |

FIG.5

| FAILURE POINT OF BANK | CAPACITANCE OF CAPACITOR BANK 31 | CAPACITANCE OF CAPACITOR BANK 32 | CAPACITANCE OF CAPACITOR BANK 33 |
|---|---|---|---|
| NO FAILURE | 1 | 2 | 4 |
| FAILURE OF CAPACITOR BANK 31 | – | 1 | 2 |
| FAILURE OF CAPACITOR BANK 32 | 1 | – | 2 |
| FAILURE OF CAPACITOR BANK 33 | 1 | 2 | – |

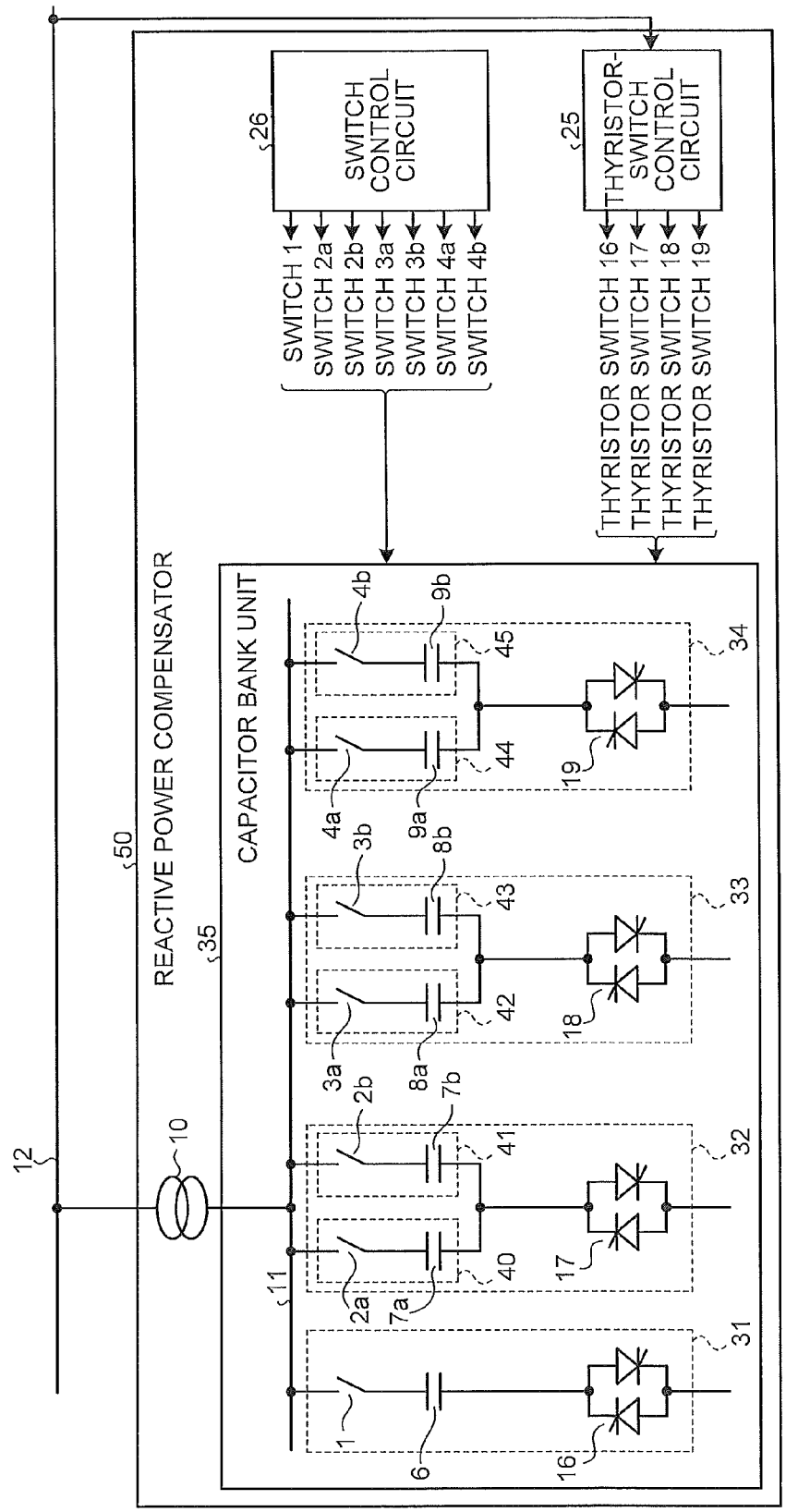

FIG.7

|  | NO FAILURE | FAILURE OF CAPACITOR BANK 31 | FAILURE OF CAPACITOR BANK 32 | FAILURE OF CAPACITOR BANK 33 | FAILURE OF CAPACITOR BANK 34 |
|---|---|---|---|---|---|
| SWITCH 1 | ON | OFF | ON | ON | ON |
| SWITCH 2a | ON | ON | OFF | ON | ON |
| SWITCH 2b | ON | OFF | OFF | ON | ON |
| SWITCH 3a | ON | ON | ON | OFF | ON |
| SWITCH 3b | ON | OFF | OFF | OFF | ON |
| SWITCH 4a | ON | ON | ON | ON | OFF |
| SWITCH 4b | ON | OFF | OFF | OFF | OFF |

FIG.8

| FAILURE POINT | CAPACITANCE OF CAPACITOR BANK 31 | CAPACITANCE OF CAPACITOR BANK 32 | CAPACITANCE OF CAPACITOR BANK 33 | CAPACITANCE OF CAPACITOR BANK 34 | MAXIMUM CAPACITANCE |
|---|---|---|---|---|---|
| NO FAILURE | 1 | 2 | 4 | 8 | 15 |
| FAILURE OF CAPACITOR BANK 31 | — | 1 | 2 | 4 | 7 |
| FAILURE OF CAPACITOR BANK 32 | 1 | — | 2 | 4 | 7 |
| FAILURE OF CAPACITOR BANK 33 | 1 | 2 | — | 4 | 7 |
| FAILURE OF CAPACITOR BANK 34 | 1 | 2 | 4 | — | 7 |

FIG.10

COMBINATION OF THYRISTOR-SWITCH SELECTION CONTROL

|  | NO FAILURE | FAILURE OF CAPACITOR BANK 31 | FAILURE OF CAPACITOR BANK 32 | FAILURE OF CAPACITOR BANK 33 | FAILURE OF CAPACITOR BANK 34 |
|---|---|---|---|---|---|
| THYRISTOR SW 16 | CONTROL WITH SIGNAL B1 | (NO CONTROL) | CONTROL WITH SIGNAL B1 | CONTROL WITH SIGNAL B1 | CONTROL WITH SIGNAL B1 |
| THYRISTOR SW 17 | CONTROL WITH SIGNAL B2 | CONTROL WITH SIGNAL B2 | (NO CONTROL) | CONTROL WITH SIGNAL B2 | CONTROL WITH SIGNAL B2 |
| THYRISTOR SW 18 | CONTROL WITH SIGNAL B3 | CONTROL WITH SIGNAL B3 | CONTROL WITH SIGNAL B3 | (NO CONTROL) | CONTROL WITH SIGNAL B3 |
| THYRISTOR SW 19 | CONTROL WITH SIGNAL B4 | CONTROL WITH SIGNAL B1 | CONTROL WITH SIGNAL B2 | CONTROL WITH SIGNAL B3 | (NO CONTROL) |

FIG.11

COMBINATION OF SWITCH SELECTION CONTROL

|  | NO FAILURE | FAILURE OF CAPACITOR BANK 31 | FAILURE OF CAPACITOR BANK 32 | FAILURE OF CAPACITOR BANK 33 | FAILURE OF CAPACITOR BANK 34 |
|---|---|---|---|---|---|
| SWITCH 1 | ON | OFF | ON | ON | ON |
| SWITCH 2 | ON | ON | OFF | ON | ON |
| SWITCH 3 | ON | ON | ON | OFF | ON |
| SWITCH 4a | ON | ON | OFF | OFF | OFF |
| SWITCH 4b | ON | OFF | OFF | OFF | OFF |
| SWITCH 4c | ON | OFF | ON | OFF | OFF |
| SWITCH 4d | ON | OFF | OFF | ON | OFF |

FIG.12

CAPACITANCE OF EACH CAPACITOR BANK DURING FAILURE (4 BANKS)

| FAILURE POINT OF BANK | CAPACITANCE OF CAPACITOR BANK 31 | CAPACITANCE OF CAPACITOR BANK 32 | CAPACITANCE OF CAPACITOR BANK 33 | CAPACITANCE OF CAPACITOR BANK 34 | MAXIMUM CAPACITANCE |
|---|---|---|---|---|---|
| NO FAILURE | 1 | 2 | 4 | 8 | 15 |
| FAILURE OF CAPACITOR BANK 31 | — | 2 | 4 | 1 | 7 |
| FAILURE OF CAPACITOR BANK 32 | 1 | — | 4 | 2 | 7 |
| FAILURE OF CAPACITOR BANK 33 | 1 | 2 | — | 4 | 7 |
| FAILURE OF CAPACITOR BANK 34 | 1 | 2 | 4 | — | 7 |

REACTIVE POWER COMPENSATOR

BACKGROUND OF THE INVENTION

1. Field of the Invention

The present invention relates to a static var compensator (SVC) that controls reactive power by switching a capacitor bank by using a thyristor switch.

2. Description of the Related Art

In typical reactive power compensators, output reactive power is adjusted step-by-step by switching a plurality of capacitor banks by using thyristor switches. In a conventional reactive power compensator, for example, Japanese Patent Application Laid-open No. S54-011452, to limit the control level per step of the reactive power below a certain value, capacitor banks having unequal capacitances in a binary manner are arranged and these capacitor banks are combined. This technique allows controlling reactive power by a small level per step even with a small number of banks.

The reactive power compensator according to Japanese Patent Application Laid-open No. S54-011452 controls the capacitances of a plurality of capacitor banks by allocating the capacitances in a binary manner, for example, 1:2:4, respectively, so that control is available in seven levels by a level control range of the capacitance 1. However, if the capacitor bank of the capacitance 2 fails, it needs to control only with the capacitor banks of the capacitance 1 and the capacitance 4, so that it results in the maximum level control range 3, consequently, a unit range of control becomes rough. For this reason, voltage fluctuations given to the power system when switching the capacitor banks become large; consequently, there is a problem that an adverse effect, such as a flicker in lighting connected to the same power system, sometimes occurs in some cases.

SUMMARY OF THE INVENTION

It is an object of the present invention to at least partially solve the problems in the conventional technology.

According to an aspect of the present invention, there is provided a reactive power compensator that includes a capacitor bank unit including a plurality of parallel connected capacitor banks, and compensates reactive power supplied by a power system by combining the capacitor banks, each of the capacitor banks having a capacitance different from other capacitor banks, and controlling connection/disconnection of the capacitor banks stepwisely by a unit of a basic capacitance. Each of the capacitor bank units is divided into a first capacitor bank having the basic capacitance, and at least one second capacitor bank that includes a plurality of subbanks. A capacitance of each one subbank included in the second capacitor bank is set to a capacitance of the capacitor bank located immediately before the subbank. When any one of the first capacitor bank and the second capacitor bank fails, each of the second capacitor bank following failed capacitor bank substitutes for the capacitor bank located immediately before the second capacitor bank.

According to another aspect of the present invention, there is provided a reactive power compensator that includes a capacitor bank unit including a plurality of parallel connected capacitor banks, and compensates reactive power supplied by a power system by combining the capacitor banks, each of the capacitor banks having a capacitance different from other capacitor banks, and controlling connection/disconnection of the capacitor banks stepwisely by a unit of a basic capacitance. Each of the capacitor bank units is divided into a first capacitor bank having the basic capacitance, and at least one second capacitor bank that includes a plurality of subbanks. A capacitance of each one subbank included in the second capacitor bank is set to a capacitance that starts from the basic capacitance and follows a multiple of the basic capacitance in accordance with a number sequence of 2 to a power of natural numbers. When any one of the first capacitor bank and the second capacitor bank fails, each of the second capacitor bank following failed capacitor bank substitutes for the capacitor bank located immediately before the second capacitor bank.

According to still another aspect of the present invention, there is provided a reactive power compensator that includes a capacitor bank unit including a plurality of parallel connected capacitor banks, and compensates reactive power supplied by a power system by combining the capacitor banks, each of the capacitor banks having a capacitance different from other capacitor banks, and controlling connection/disconnection of the capacitor banks stepwisely by a unit of a basic capacitance. Each of the capacitor bank units is divided into a first capacitor bank having a largest capacitance among the capacitor banks, and at least one second capacitor bank other than the first capacitor bank. The first capacitor bank includes subbanks as many as a number of the second capacitor banks, and a capacitance of each of the subbanks is set to a series of capacitances of the second capacitor banks that starts from the basic capacitance. When any one of the second capacitor banks fails, one of the subbanks having a capacitance equal to a capacitance of failed capacitor bank is selected from the first capacitor bank, and selected capacitor bank substitutes for the failed capacitor bank.

According to still another aspect of the present invention, there is provided a reactive power compensator that includes a capacitor bank unit including a plurality of parallel connected capacitor banks, and compensates reactive power supplied by a power system by combining the capacitor banks, each of the capacitor banks having a capacitance different from other capacitor banks, and controlling connection/disconnection of the capacitor banks stepwisely by a unit of a basic capacitance. Each of the capacitor bank units is divided into a first capacitor bank having a largest capacitance among the capacitor banks, and at least one second capacitor bank other than the first capacitor bank. The first capacitor bank includes subbanks as many as a number of the second capacitor banks, and a capacitance of each of the subbanks is set to a series of capacitances that starts from the basic capacitance and follows a multiple of the basic capacitance in accordance with a number sequence of 2 to the power of natural numbers. When any one of the second capacitor banks fails, one of the subbanks having a capacitance equal to a capacitance of failed capacitor bank is selected from the first capacitor bank, and selected capacitor bank substitutes for the failed capacitor bank.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a schematic diagram for explaining switch selection control according to the first embodiment;

FIG. 5 is a schematic diagram that depicts capacitances of respective capacitor banks in the reactive power compensator according to the first embodiment when some of the capacitor banks have failed;

FIG. 6 is schematic diagram of a reactive power compensator according to a third embodiment of the present invention;

FIG. 7 is a schematic diagram for explaining switch selection control by the reactive power compensator according to the third embodiment;

FIG. 8 is a schematic diagram that depicts capacitances of respective capacitor banks in the reactive power compensator according to the third embodiment when some of the capacitor banks have failed;

FIG. 10 is a schematic diagram for explaining thyristor-switch selection control according to the fourth embodiment;

FIG. 11 is a schematic diagram for explaining switch selection control according to the fourth embodiment; and FIG. 12 is a schematic diagram that depicts capacitances of respective capacitor banks in the reactive power compensator according to the fourth embodiment when some of the capacitor banks have failed.

DETAILED DESCRIPTION OF THE PREFERRED EMBODIMENTS

Exemplary embodiments of the present invention will be explained below in detail with reference to the accompanying drawings. However, the present invention is not limited by the embodiments.

Figure 1:
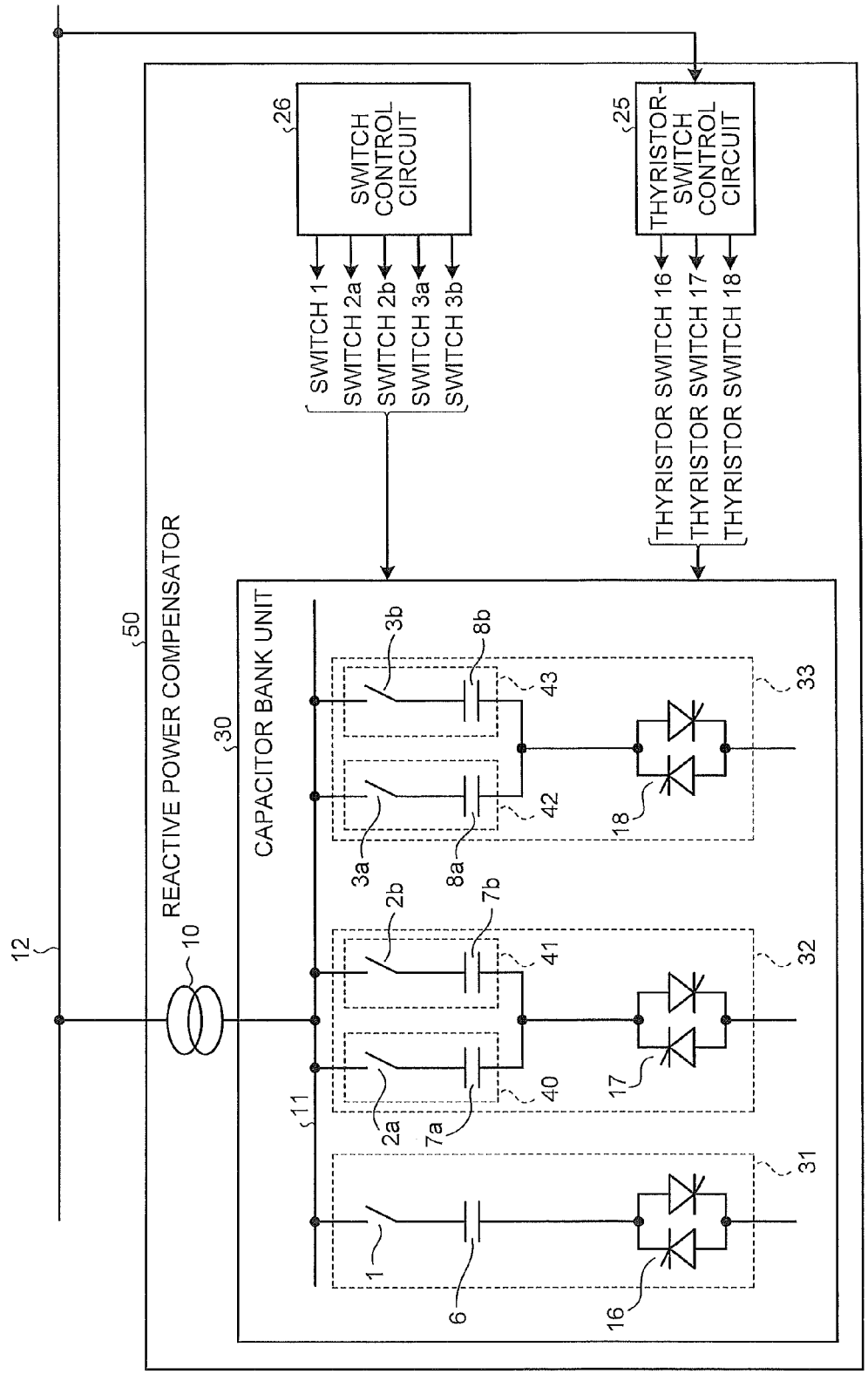
FIG. 1 is a schematic diagram of a reactive power compensator according to a first embodiment of the present invention.

FIG. 1 is a schematic diagram of a reactive power compensator 50 according to a first embodiment of the present invention. The reactive power compensator 50 includes a transformer 10, a capacitor bank unit 30, a switch control circuit 26, and a thyristor-switch control circuit 25.

The capacitor bank unit 30 includes a plurality of capacitor banks. In the example shown in FIG. 1 the capacitor bank unit 30 includes three capacitor banks 31 to 33. The capacitor bank 31 as a first capacitor bank is switched by a thyristor switch 16 as a second switch. The capacitor banks 32 and 33 as second capacitor banks are switched by thyristor switches 17 and 18, respectively.

The capacitor bank 31 includes a switch 1, the capacitor bank 32 includes switches 2a and 2b, and the capacitor bank 33 includes switches 3a and 3b. The switches 1, 2a and 2b, and 3a and 3b are first switches.

The capacitor bank 31 includes the switch 1, a capacitor 6, and the thyristor switch 16. The capacitor bank 32 includes a subbank 40 that includes the switch 2a and a capacitor 7a, and a subbank 41 that includes the switch 2b and a capacitor 7b. The capacitor bank 33 includes a subbank 42 that includes the switch 3a and a capacitor 8a, and a subbank 43 that includes the switch 3b and a capacitor 8b.

The capacitances of the capacitor banks 31 to 33 are in the ratio 1:2:4. The configurations of the capacitor banks 31 to 33 are explained below in detail.

The capacitor bank 31 is set to a capacitance 1 that is a basic capacitance. The capacitor bank 31 includes the capacitor 6 of a capacitance 1, and the thyristor switch 16 that is connected to the capacitor 6 in series. The capacitor bank 31 is connected to a bus 11 via the switch 1. The bus 11 is connected to the secondary side of the transformer 10.

The capacitor bank 32 is set to a capacitance 2. The capacitor bank 32 includes the capacitor 7a of a capacitance 1 and the capacitor 7b of a capacitance 1 connected in parallel to the capacitor 7a. The capacitor 7a and the capacitor 7b are switched with a common switch, i.e., the thyristor switch 17. The capacitor 7a and the capacitor 7b are connected to the bus 11 via the switches 2a and 2b, respectively.

The capacitor bank 33 is set to a capacitance 4. The capacitor bank 33 includes the capacitor 8a of a capacitance 2 and the capacitor 8b of a capacitance 2 connected in parallel to the capacitor 8a. The capacitor 8a and the capacitor 8b are switched with a common switch, i.e., the thyristor switch 18. The capacitor 8a and the capacitor 8b are connected to the bus 11 via the switches 3a and 3b, respectively.

The thyristor switches 16 to 18 are controlled by the thyristor-switch control circuit 25. On the other hand, the switches 1, 2a, 2b, 3a, and 3b are controlled by the switch control circuit 26.

In this way, the capacitor bank unit 30 includes a series of capacitor banks 31 to 33 each having a certain capacitance and the capacitances being multiples of the basic capacitance in accordance with a number sequence of the n-th (n=0, 1, . . . , k, where k is a natural number) power of 2. Moreover, the capacitance of each of the subbanks (for example, the subbanks 40 and 42) included in the capacitor banks 32 and 33 as the second capacitor banks is set to a capacitance that is a multiple of the basic capacitance in accordance with a number sequence of the m-th (m=0, 1, . . . , k−1) power of 2 (a configuration shown in FIG. 1 corresponds to a case where k=2).

Figures 2, 3:
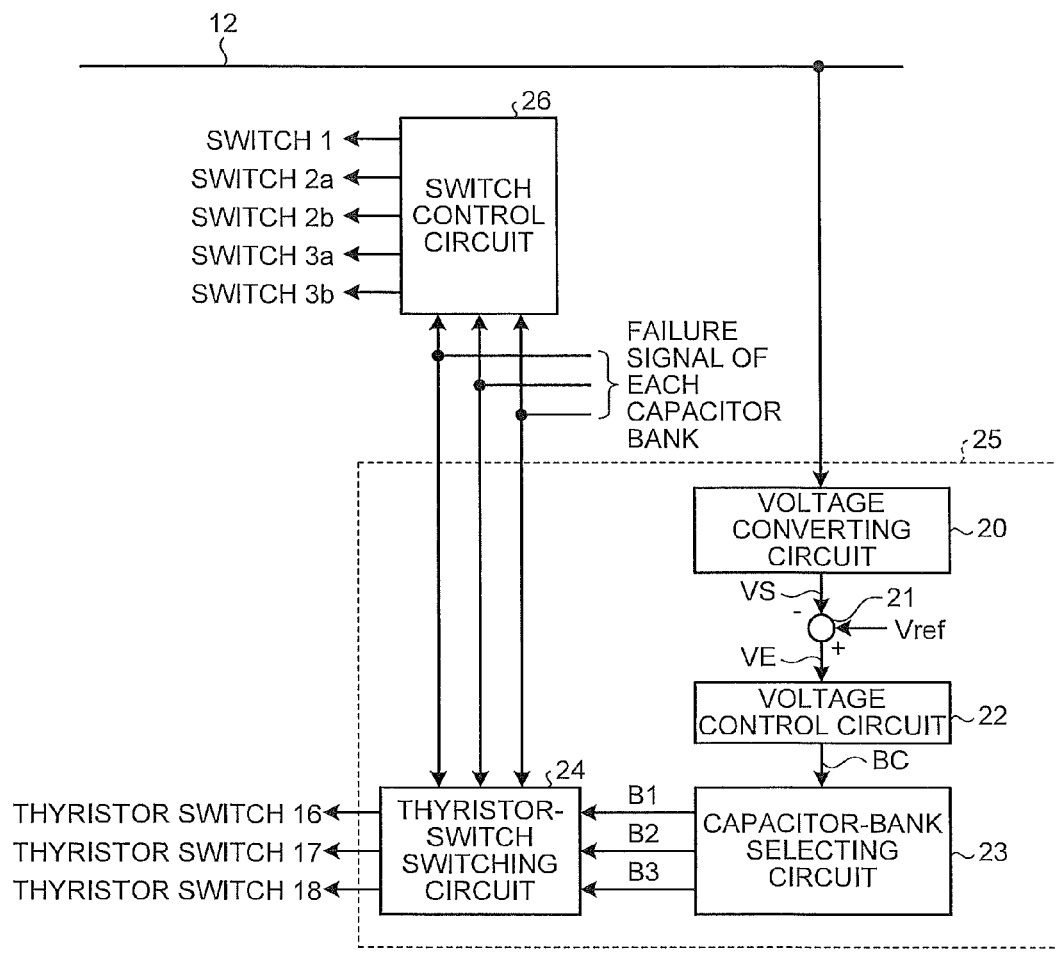
FIG. 2 is a schematic diagram of a thyristor-switch control circuit according to the first embodiment.
FIG. 3 is a schematic diagram for explaining thyristor-switch selection control according to the first embodiment.

FIG. 2 is a schematic diagram of the thyristor-switch control circuit 25; FIG. 3 is a schematic diagram for explaining thyristor-switch selection control; FIG. 4 is a schematic diagram for explaining switch selection control; and FIG. 5 is a schematic diagram that depicts capacitances of respective capacitor banks when some of the capacitor banks have failed. In this specification, failure of a capacitor bank means failure of at least one of the switches, the capacitors, and the thyristors included in the capacitor banks.

As shown in FIG. 2, the thyristor-switch control circuit 25 includes a voltage converting circuit 20 that converts a voltage of a power system 12 into a rectified RMS (root mean square) voltage VS, a subtraction circuit 21 that calculates a control error signal VE by subtracting the RMS voltage value VS from a voltage reference signal Vref, and a voltage control circuit 22 that includes a first order lag (not shown) and that calculates a capacitor-capacitance control signal BC from the control error signal VE and outputs the capacitor-capacitance control signal BC.

The thyristor-switch control circuit 25 further includes a capacitor-bank selecting circuit 23 that receives the capacitor-capacitance control signal BC, selects a capacitance for each of the capacitor banks 31 to 33 based on the capacitor-capacitance control signal BC, and outputs capacitor selection signals B1 to B3 corresponding to the selected capacitances.

For example, when none of the capacitor banks 31 to 33 has failed, and when outputting signals corresponding to a value of the capacitor-capacitance control signal BC that has a capacitance 1, the capacitor-bank selecting circuit 23 outputs signals B1, B2, and B3 having values 1, 0, and 0, (a binary number), respectively. When outputting signals corresponding to a value of the capacitor-capacitance control signal BC that has a capacitance 2, the capacitor-bank selecting circuit 23 outputs signals B1, B2, and B3 having values 0, 1, and 0, respectively. Moreover, when outputting signals corresponding to a value of the capacitor-capacitance control signal BC that has a capacitance 4, the capacitor-bank selecting circuit 23 outputs signals B1, B2, and B3 having values 0, 0, and 1, respectively.

The thyristor-switch control circuit 25 further includes a thyristor-switch switching circuit 24 that receives the capacitor selection signals B1 to B3 and receives a failure signal of each capacitor bank. The thyristor-switch switching circuit 24 controls one or more of the thyristor switches 16 to 18 based on a combination of preset selection logic, as shown in FIG. 3, and based on the capacitor selection signals B1 to B3 and the failure signals.

For example, when the capacitor bank 31 has failed, the thyristor-switch switching circuit 24 controls the thyristor switch 17 with the capacitor selection signal B1 and controls the thyristor switch 18 with the capacitor selection signal B2. When the capacitor bank 32 has failed, the thyristor-switch switching circuit 24 controls the thyristor switch 16 with the capacitor selection signal B1, and controls the thyristor switch 18 with the capacitor selection signal B2.

The switch control circuit 26 also receives the failure signals. The switch control circuit 26 controls one or more of the switches 1, 2a, 2b, 3a, and 3b in accordance with a combination of preset selection logic, for example, as shown in FIG. 4, and based on the failure signals. For example, when the capacitor bank 31 has failed, turns ON one of the switches 2a and 2b (for example, the switch 2a) and turns OFF the other switch (i.e., the switch 2b), and turns ON one of the switches 3a and 3b (for example, the switch 3a) and turns OFF the other switch (i.e., the switch 3b). In other words, the switches 1, 2a, 2b, 3a, and 3b are connected to the capacitors 6 to 8b in series, respectively, and when any one of the capacitor banks 31 to 33 fails, the switches 1 to 3b carry out switching in accordance with the preset selection logic, and controls the capacitances of the capacitor banks 31 to 33 as shown in FIG. 5.

As shown in FIG. 5, when none of the capacitor banks 31 to 33 has failed, the capacitor bank 31 has a capacitance 1, the capacitor bank 32 has a capacitance 2, and the capacitor bank 33 has a capacitance 4.

When the capacitor bank 31 has failed, control is provided so that the capacitor bank 32 as the second capacitor bank has a capacitance 1 that is the capacitance of the failed capacitor bank 31 as the first capacitor bank. Precisely, the capacitance of the capacitor bank 32 is changed to the capacitance of the failed capacitor bank 31, that is, the capacitance of the capacitor bank 32 is set to a value that is lower than its normal value. Moreover, control is provided so that the capacitor bank 33 as the second capacitor bank has a capacitance 2 that was originally the capacitance of the capacitor bank 32 as the first capacitor bank. Precisely, the capacitance of the capacitor bank 33 is changed to the capacitance of the capacitor bank 32 arranged immediately before itself, that is, the capacitance of the capacitor bank 33 is set to a value that is lower than its normal value.

As explained above, the reactive power compensator 50 includes the capacitor banks and the capacitances of the capacitor banks can be changed to the capacitance of one of the capacitor banks. When any one of the capacitor banks fails, the capacitance of one of the capacitor banks in normal operation is changed to the capacitance of the failed capacitor bank between the capacitor banks. Accordingly, even when any one of the capacitor banks fails, the capacitances are automatically controlled to the capacitance allocation by 1:2, so that when any of the capacitor banks fails, detailed reactive power control can be maintained by the rest of the capacitor banks in normal operation, without changing the control level per step of 1.

The reactive power compensator 50 according to the first embodiment is configured to have the capacitor banks 31 to 33 with the capacitances divided by 1:2:4 in a perfect binary manner. On the other hand, the reactive power compensator 50 according to a second embodiment of the present invention is configured to obtain similar effects with capacitor banks 31 to 33 that have unequally divided capacitances that are divided not in a perfect binary manner, for example, capacitances divided by 1:2:3. Precisely, turning ON and OFF of the capacitor banks 31 to 33 can be controlled stepwisely by the unit of the basic capacitance (for example, 1), by combining the capacitor banks 31 to 33 that have respective capacitances different from one another. A configuration and operations of the reactive power compensator 50 according to the second embodiment are explained below with reference to each of the drawings of the reactive power compensator 50 according to the first embodiment. Components similar to those according to the first embodiment are assigned with the same reference numerals and letters, and explanations of them are omitted.

In the second embodiment, each capacitance of the capacitor banks 31 to 33 shown in FIG. 1 is defined as described below. For example, it is assumed that the capacitor bank 31 includes the capacitor 6 of a capacitance 1, similarly to the first embodiment; the capacitor bank 32 includes the capacitors 7a and 7b of a capacitance 1; and the capacitor bank 33 includes the capacitor 8a of a capacitance 2 and the capacitor 8b of a capacitance 1.

As shown in FIG. 5, for example, when the capacitor bank 32 has failed, control is provided so that the capacitor bank 31 has a capacitance 1, and the capacitance of the capacitor bank 33 is changed to a capacitance corresponding to the capacitance 2 of the capacitor bank 32, so that the total capacitance is 3. When the capacitor bank 33 has failed, control is provided so that the capacitor bank 31 has the capacitance 1, and the capacitor bank 32 has the capacitance 2, so that again the total capacitance is 3.

A concrete example will be explained below. The capacitor bank unit 30 includes the capacitor bank 31 of which capacitance is set to a basic capacitance (for example, 1), and at least one of the capacitor banks 32 and 33 that includes the subbanks 40 to 43. When the capacitance of a subbank (for example, the subbank 42) is 2, it means that the capacitance of a capacitor bank arranged immediately before that subbank (i.e., the capacitor bank 32) is 2. Moreover, when the capacitor bank 32 fails, the capacitor bank 33 following the failed capacitor bank 32 substitutes for the capacitor bank 32 that is arranged immediately before the capacitor bank 33.

As explained above, similarly to the reactive power compensator 50 according to the first embodiment, the reactive power compensator 50 according to the second embodiment includes the capacitor banks of each of which capacitance can be changed to a capacitance of one of the capacitor banks. When any one of the capacitor banks fails, the capacitance of one of the capacitor banks in normal operation between the capacitor banks is changed to the capacitance equal to that of the failed capacitor bank among the capacitor banks. Accordingly, even when the capacitances are allocated in unequally-divided capacitances not in a perfect binary-division manner, such as in the ratio of 1:2:3, the reactive power compensator 50 according to the second embodiment can obtain an effect similar to that obtained by the reactive power compensator 50 according to the first embodiment.

The reactive power compensator 50 according to each of the first and second embodiments includes three capacitor banks 31 to 33. On the contrary, a reactive power compensator 50 according to a third embodiment of the present invention obtains similar effects with four or more capacitor banks. Components similar to those according to the first embodiment are assigned with the same reference numerals and letters, and explanations of them are omitted.

FIG. 6 is schematic diagram of a reactive power compensator 50 according to the third embodiment. The reactive power compensator 50 includes a capacitor bank unit 35. A capacitor bank 34 is switched by a thyristor switch 19, similarly to the other capacitor banks, namely, the capacitor banks 31 to 33. Moreover, similarly to the capacitor banks 32 and 33, the capacitor bank 34 includes a subbank 44 that includes a switch 4a and a capacitor 9a, and a subbank 45 a switch 4b and a capacitor 9b.

Each capacitance of the capacitor banks 31 to 34 is defined as described below. For example, it is assumed that the capacitor bank 31 includes the capacitor 6 of a capacitance 1, similarly to the first embodiment; the capacitor bank 32 includes the capacitors 7a an 7b of a capacitance 1; the capacitor bank 33 includes the capacitors 8a and 8b of a capacitance 2; and the capacitor bank 34 includes the capacitors 9a and 9b of a capacitance 4.

In this manner, the capacitor bank unit 30 includes a series of capacitor banks 31 to 34 each having a certain capacitance and the capacitances being multiples of the basic capacitance in accordance with a number sequence of the n-th (n=0, 1, . . . , k, where k is a natural number) power of 2. Moreover, the capacitance of each of the subbanks (for example, the subbanks 40, 42, and 44) included in the capacitor banks 32 to 34 as the second capacitor banks is set to a capacitance that is a multiple of the basic capacitance in accordance with a number sequence of the m-th (m=0, 1, . . . , k−1) power of 2 (a configuration shown in FIG. 6 corresponds to a case where k=3).

The capacitor-bank selecting circuit 23 (see FIG. 2) selects a capacitance of a capacitor bank appropriate to the capacitor-capacitance control signal BC among the capacitor banks divided by 1:2:4:8 in a binary manner, and outputs capacitor selection signals corresponding to the capacitance of the selected capacitor bank. Each capacitor selection signal is input into the thyristor-switch switching circuit 24 in the next stage, and then the thyristor-switch switching circuit 24 selects some of the thyristor switches 16 to 19 to be used in accordance with presence or absence of failure in the capacitor banks 31 to 34.

FIG. 7 is a schematic diagram for explaining switch selection control by the reactive power compensator 50; and FIG. 8 is a schematic diagram that depicts the capacitances of respective capacitor banks in the event of failure of part of the capacitor banks in the reactive power compensator 50.

As shown in FIG. 7, the switch control circuit 26 selects a switch to be opened among the switches 1 to 4b in accordance with presence or absence of failure in the capacitor banks, as described below. For example, when the capacitor bank 32 has failed, the switch control circuit 26 turns ON the switch 1, turns ON one of the switches 3a and 3b (for example, the switch 3a) and turns OFF the other switch (i.e., the switch 3b), turns ON one of the switches 4a and 4b (for example, the switch 4a) and turns OFF the other switch (i.e., the switch 4b).

As shown in FIG. 8, for example, when the capacitor bank 32 has failed, the capacitor bank 31 has the capacitance 1, control is provided so that the capacitance of the capacitor bank 33 is changed to a capacitance corresponding to the capacitance 2 of the capacitor bank 32, and the capacitance of the capacitor bank 34 is changed to a capacitance corresponding to the capacitance 4 of the capacitor bank 33, so that the total capacitance is 7.

When the capacitor bank 33 has failed, the capacitor bank 31 has capacitance 1, the capacitor bank 32 has the capacitance 2, and control is provided so that the capacitance of the capacitor bank 34 is changed to a capacitance corresponding to the capacitance 4 of the capacitor bank 33, so that again the total capacitance is 7.

The reactive power compensator 50 can be configured to have the capacitances of the capacitor banks allocated in an unequally divided manner other than the ratio of 1:2:4:8, for example, 1:2:4:7, 1:2:4:6, or 1:2:4:5. Similar effects can be obtained even with this configuration. In such case, the capacitor bank 34 can be configured to include a capacitor of the capacitance 4 so that the capacitance of a capacitor included in the capacitor bank 34 will be changed to a capacitance corresponding to the capacitance 4 of the capacitor bank 33.

Moreover, the reactive power compensator 50 can be configured to have unequally divided capacitances of the capacitor banks, for example, 1:2:3:7, or 1:2:3:5. In this case, the capacitor bank 34 can be configured to include a capacitor of a capacitance 3 so that the capacitance of the capacitor bank 34 can be changed to a capacitance corresponding to the capacitance 3 of the capacitor bank 33.

As explained above, the reactive power compensator 50 is configured to include the capacitor banks and the capacitances of the capacitor banks can be changed to the capacitance of one of the capacitor banks; and, when any one of the capacitor banks fails, the capacitance of one of the capacitor banks in normal operation is changed to have a capacitance equal to the capacitance of the failed capacitor bank among the capacitor banks. Accordingly, even when any one of the capacitor banks fails, the reactive power compensator 50 can obtain an effect similar to that obtained by the reactive power compensator 50. Moreover, even when the capacitances are allocated in an unequally divided manner other than the ratio of 1:2:4:8, an effect similar to that obtained by the reactive power compensator 50 according to the first embodiment can be obtained.

The configurations of the first to third embodiments can be generalized as explained as described below. That is, the reactive power compensator according to those embodiments include a capacitor bank unit including a plurality of capacitor banks connected in parallel, and to compensate reactive power supplied by a power system by combining the capacitor banks, each of the capacitor banks having a capacitance different from other capacitor banks, and controlling connection/disconnection of the capacitor banks stepwisely by a unit of a basic capacitance is configured as follows. Each of the capacitor bank units is divided into a first capacitor bank having the basic capacitance, and at least one second capacitor bank that includes a plurality of subbanks, and the capacitance of each subbank included in the second capacitor bank is set to a capacitance of the capacitor bank located immediately before the subbank; and when any one of the first capacitor bank and the second capacitor bank fails, control is provided so that each of the second capacitor bank following the failed capacitor bank substitutes for the capacitor bank located immediately before the second capacitor bank.

Moreover, the reactive power compensator according to those embodiments includes a capacitor bank unit including a plurality of capacitor banks connected in parallel, and to compensate reactive power supplied by a power system by combining the capacitor banks, each of the capacitor banks having a capacitance different from other capacitor banks, and controlling connection/disconnection of the capacitor banks stepwisely by a unit of a basic capacitance can be configured as follows. Each of the capacitor bank units is divided into a first capacitor bank having the basic capacitance, and at least one second capacitor bank that includes a plurality of subbanks, and the capacitance of each subbank included in the second capacitor bank is set to a capacitance that starts from the basic capacitance and follows a multiple of the basic capacitance in accordance with a number sequence of 2 to the power of natural numbers; and when any one of the first capacitor bank and the second capacitor bank fails, each of the second capacitor bank following the failed capacitor bank substitutes for the capacitor bank located immediately before the second capacitor bank.

Furthermore, the reactive power compensator as described above can have a capacitance of each of the capacitor banks included in each of the capacitor bank units being set to a capacitance that starts from the basic capacitance and follows a multiple of the basic capacitance in accordance with a number sequence of 2 to the power of natural numbers.

The reactive power compensator 50 according to the third embodiment is configured so that when any one of the capacitor banks 31 to 33 fails other than the capacitor bank 34 having the largest capacitance, control is provided so that every one of the capacitor banks following the failed capacitor bank (the capacitor banks having a larger capacitance) substitutes for the capacitor bank located immediately before itself. However, the reactive power compensator 50 according to a fourth embodiment of the present invention discloses a such configuration that when any one of the capacitor banks 31 to 33 fails other than the capacitor bank 34 having the largest capacitance, control is provided so that at least one of the subbanks included in the capacitor bank 34 substitutes for the failed capacitor bank. The fourth embodiment focuses attention on that when the capacitor bank 34 having the largest capacitance fails, operation can be continued in the same configuration.

Figure 9:
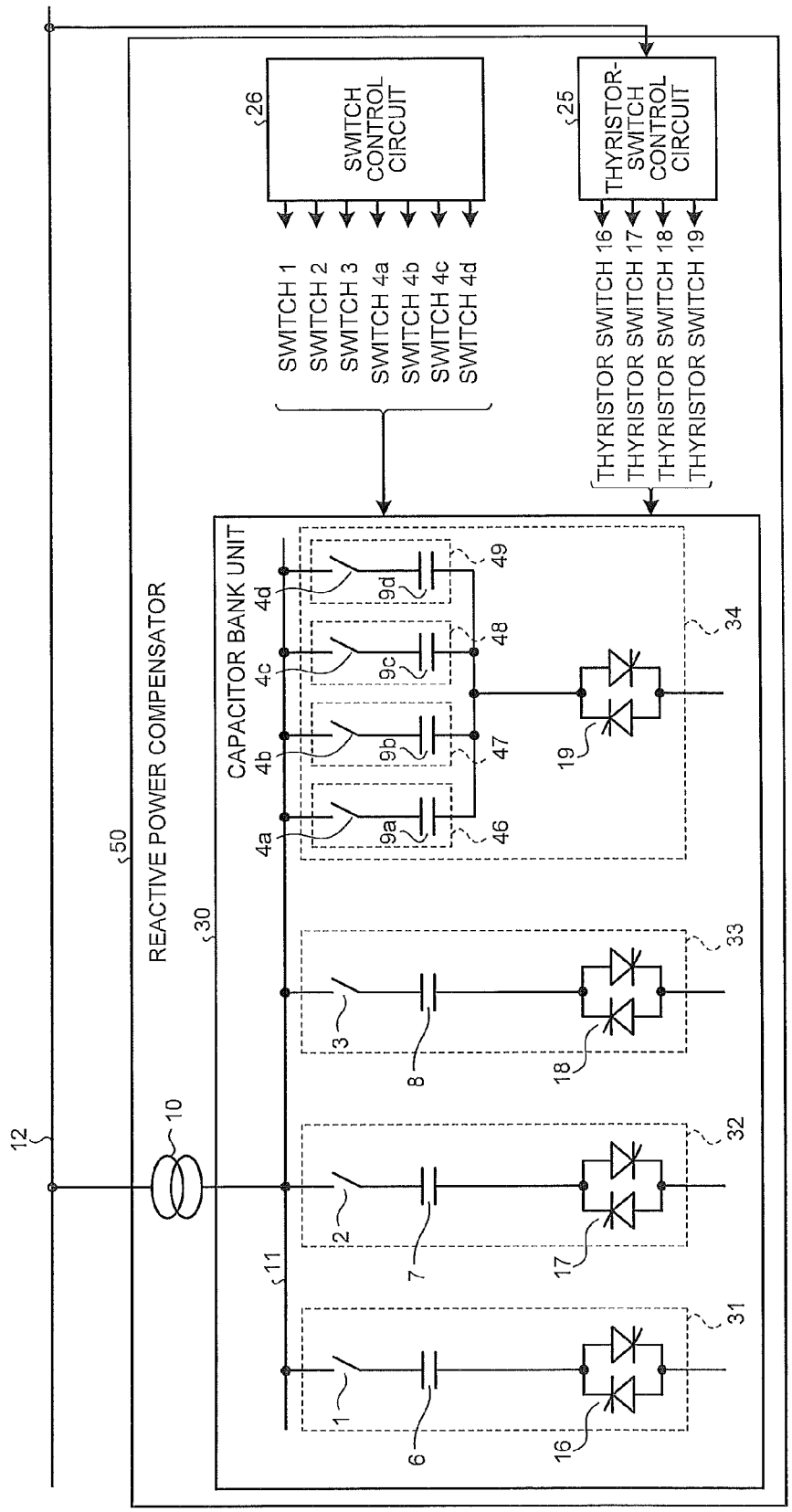
FIG. 9 is a schematic diagram of a reactive power compensator according to a fourth embodiment of the present invention.

FIG. 9 is a schematic diagram of the reactive power compensator 50 according to the fourth embodiment of the present invention. The capacitor banks 31 to 33 as second capacitor banks according to the fourth embodiment include switches 1 to 3 as first switches, respectively. The capacitor bank 31 includes the switch 1, the capacitor 6, and the thyristor switch 16; the capacitor bank 32 includes a switch 2, a capacitor 7, and the thyristor switch 17; and the capacitor bank 33 includes a switch 3, a capacitor 8, and the thyristor switch 18. In this way, in the capacitor bank unit 30 according to the fourth embodiment, each of the capacitor banks 31 to 33 other than the capacitor bank 34 with the largest capacitance includes one switch, one capacitance, and one thyristor switch.

On the other hand, the capacitor bank 34 as a first capacitor bank according to the fourth embodiment includes a subbank 46 that includes the switch 4a and the capacitor 9a, a subbank 47 that includes the switch 4b and the capacitor 9b, a subbank 48 that includes a switch 4c and a capacitor 9c, a subbank 49 that includes a switch 4d and a capacitor 9d. The subbanks 46 to 49 included in the capacitor bank 34 as the first bank are switched by the thyristor switch 19

The capacitances of the capacitor banks 31 to 34 are allocated at the ratio 1:2:4:8, respectively. The configurations of the capacitor banks 31 to 34 are explained below in detail.

The capacitor bank 31 is set to a capacitance 1 that is the basic capacitance. The capacitor bank 31 includes the capacitor 6 of a capacitance 1, and the thyristor switch 16 that is connected to the capacitor 6 in series. The capacitor bank 31 is connected to the bus 11 via the switch 1. The bus 11 is connected to the secondary side of the transformer 10.

The capacitor bank 32 is set to a capacitance 2. The capacitor bank 32 includes the capacitor 7 of a capacitance 2, and the thyristor switch 17 that is connected to the capacitor 7 in series. The capacitor bank 32 is connected to the bus 11 via the switch 2.

The capacitor bank 33 is set to a capacitance 4. The capacitor bank 33 includes the capacitor 8 of a capacitance 4, and the thyristor switch 18 that is connected to the capacitor 8 in series. The capacitor bank 33 is connected to the bus 11 via the switch 3.

On the other hand, the capacitor bank 34 is set to a capacitance 8. The capacitor bank 34 includes the capacitor 9a of a capacitance 1, the capacitor 9b of a capacitance 1, the capacitor 9c of a capacitance 2, and the capacitor 9d of a capacitance 4 connected in parallel one to another. The capacitor 9a, the capacitor 9b, the capacitor 9c, and the capacitor 9d are switched with a common switch, i.e., the thyristor switch 19. The capacitors 9a, 9b, 9c, and 9d are connected to the bus 11 via the switches 4a, 4b, 4c, and 4d, respectively. The bus 11 is connected to the secondary side of the transformer 10.

The thyristor switches 16 to 19 are controlled by the thyristor-switch control circuit 25. On the other hand, the switches 1, 2, 3, 4a, 4b, 4c, and 4d are controlled by the switch control circuit 26, similarly to the third embodiment.

FIG. 10 is a schematic diagram for explaining thyristor-switch selection control; FIG. 11 is a schematic diagram for explaining switch selection control; and FIG. 12 is a schematic diagram that depicts capacitances of respective capacitor banks when some of the capacitor banks have failed. The thyristor control circuit shown in FIG. 2 can be used similarly to the first to third embodiments.

When none of the capacitor banks 31 to 34 has failed, and when outputting signals corresponding to a value of the capacitor-capacitance control signal BC that has a capacitance 1, the capacitor-bank selecting circuit 23 outputs signals B1, B2, B3, B4 having values 1, 0, 0, 0, (a binary number), respectively. When outputting signals corresponding to a value of the capacitor-capacitance control signal BC that has a capacitance 2, the capacitor-bank selecting circuit 23 outputs signals B1, B2, B3, B4 having values 0, 1, 0, 0, respectively. Moreover, when outputting signals corresponding to a value of the capacitor-capacitance control signal BC that has a capacitance 4, the capacitor-bank selecting circuit 23 outputs signals B1, B2, B3, B4 having values 0, 0, 1, 0, respectively. Furthermore, when outputting signals corresponding to a value of the capacitor-capacitance control signal BC that has a capacitance 8, the capacitor-bank selecting circuit 23 outputs signals B1, B2, B3, B4 having values 0, 0, 0, 1, respectively.

For example, when the capacitor bank 31 has failed, the thyristor-switch switching circuit 24 controls the thyristor switch 19 with the capacitor selection signal B1. When the capacitor bank 32 has failed, the thyristor-switch switching circuit 24 controls the thyristor switch 19 with the capacitor selection signal B2. When the capacitor bank 33 has failed, the thyristor-switch switching circuit 24 controls the thyristor switch 19 with the capacitor selection signal B3.

The switch control circuit 26 (see FIG. 2) also receives the failure signals. The switch control circuit 26 controls one or more of the switches 1, 2, 3, 4a, 4b, 4c, and 4d in accordance with a combination of preset selection logic, for example, as shown in FIG. 11, and based on the failure signals. For example, when the capacitor bank 31 has failed, the switch control circuit 26 turns ON the switch 4a to be connected to a capacitor of a capacitance 1 (it can be the switch 4b, alternatively) among the switches 4a, 4b, 4c, and 4d included in the capacitor bank 34, and turns OFF the other switches 4b, 4c, and 4d.

When the capacitor bank 32 has failed, the switch control circuit 26 turns ON the switch 4c to be connected to the capacitor of a capacitance 2 among the switches 4a, 4b, 4c, and 4d included in the capacitor bank 34, and turns OFF the other switches 4a, 4b, and 4d.

When the capacitor bank 33 has failed, the switch control circuit 26 turns ON the switch 4d to be connected to the capacitor of a capacitance 4 among the switches 4a, 4b, 4c, and 4d included in the capacitor bank 34, and turns OFF the other switches 4a, 4b, and 4c.

When the capacitor bank 34 has failed, all of the switches included in the capacitor bank 34 are turned OFF.

When the switches 1, 2, 3, 4a, 4b, 4c, and 4d are controlled in the above manner, the capacitances of the capacitor banks 31 to 34 are controlled in the manner shown in FIG. 12. For example, when the capacitor bank 31 has failed, the capacitance of the capacitor bank 34 as a first capacitor bank is changed to a capacitance corresponding to the capacitance 1 of the capacitor bank 31; when the capacitor bank 32 has failed, the capacitance of the capacitor bank 34 is changed to a capacitance corresponding to the capacitance 2 of the capacitor bank 32; and when the capacitor bank 33 has failed, the capacitance of the capacitor bank 34 is changed to a capacitance corresponding to the capacitance 4 of the capacitor bank 33, so that the total capacitance is 7 in any of such cases.

The reactive power compensator 50 according to the fourth embodiment can be configured to have the capacitances of the capacitor banks allocated in an unequally divided manner other than the ratio of 1:2:4:8, for example, 1:2:4:7, 1:2:4:6, 1:2:4:5, 1:2:3:7, or 1:2:3:5. Similar effects can be obtained even with this configuration. In a case of the capacitances of the capacitor banks allocated in the ratio of 1:2:4:7, the capacitor bank 34 can be configured to include three subbanks allocated at the ratio in capacitance 1:2:4. Similarly, the capacitor bank 34 can be configured to include three subbanks allocated at the ratio in capacitance 1:2:3 in a case of the capacitances of the capacitor banks allocated in the ratio of 1:2:4:6; to include three subbanks allocated at the ratio in capacitance 1:2:2 in a case of the capacitances of the capacitor banks allocated in the ratio of 1:2:4:5; to include three subbanks allocated at the ratio in capacitance 1:2:4 in a case of the capacitances of the capacitor banks allocated in the ratio of 1:2:3:7; and to include three subbanks allocated at the ratio in capacitance 1:2:2 in a case of the capacitances of the capacitor banks allocated in the ratio of 1:2:3:5.

As explained above, the reactive power compensator 50 according to the fourth embodiment includes the capacitor bank 34 of which capacitance can be changed to a capacitance of any one of the capacitor banks 31 to 33. When any one of the capacitor banks 31 to 33 fails, the capacitance of the capacitor bank 34, which is in normal operation, is changed to the capacitance equal to that of the failed capacitor bank among the capacitor banks 31 to 33. Accordingly, even when any one of the capacitor banks 31 to 33 fails, the reactive power compensator 50 according to the fourth embodiment can obtain an effect similar to that obtained by one of the reactive power compensators according to the first to third embodiments. Moreover, even when the capacitances of the capacitor banks are allocated in unequally-divided capacitances other than the ratio of 1:2:4:8, the reactive power compensator 50 according to the fourth embodiment can obtain an effect similar to that obtained by one of the reactive power compensators according to the first to third embodiments.

Although the reactive power compensators according to each of the first to fourth embodiments uses the thyristor switches 16 to 19 as an example of providing a quick response, the present invention is not limited this. For example, a semiconductor switch or a mechanical switch can be used instead of the thyristor switches 16 to 19.

The configuration of the reactive power compensator described in each of the embodiments presents an example of contents of the present invention, can be further combined with another known technology, and can be changed, for example, by omitting part of the configuration, within a scope not departing from the main concept of the present invention.

According to an aspect of the present invention, when one or more of a plurality of capacitor banks fails, reactive power compensation can be continued without changing the control level per step.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A reactive power compensator that includes a capacitor bank unit including a plurality of parallel connected capacitor banks, and compensates reactive power supplied by a power system by combining the capacitor banks, each of the capacitor banks having a capacitance different from other capacitor banks, and controlling connection/disconnection of the capacitor banks stepwisely by a unit of a basic capacitance, wherein each of the capacitor bank units is divided into
a first capacitor bank having the basic capacitance, and
at least one second capacitor bank that includes a plurality of subbanks,
a capacitance of each one subbank included in the second capacitor bank is set to a capacitance of the capacitor bank located immediately before the subbank, and
when any one of the first capacitor bank and the second capacitor bank fails, each of the second capacitor bank following failed capacitor bank substitutes for the capacitor bank located immediately before the second capacitor bank.

2. The reactive power compensator according to claim 1, wherein the second capacitor bank includes
a first switch that is serially connected to a capacitor included in the subbank, and when any one of the capacitor banks fails, changes capacitance of the second capacitor bank by performing switching in accordance with a predetermined selection logic; and
a second switch that carries out one of connection/disconnection of each of the capacitor banks, based on a signal for connecting the second capacitor bank and the selection logic.

3. The reactive power compensator according to claim 2, wherein the second switch includes a thyristor switch.

4. A reactive power compensator that includes a capacitor bank unit including a plurality of parallel connected capacitor banks, and compensates reactive power supplied by a power system by combining the capacitor banks, each of the capacitor banks having a capacitance different from other capacitor banks, and controlling connection/disconnection of the capacitor banks stepwisely by a unit of a basic capacitance, wherein each of the capacitor bank units is divided into
a first capacitor bank having the basic capacitance, and
at least one second capacitor bank that includes a plurality of subbanks, a capacitance of each one subbank included in the second capacitor bank is set to a capacitance that starts from the basic capacitance and follows a multiple of the basic capacitance in accordance with a number sequence of 2 to a power of natural numbers, and when any one of the first capacitor bank and the second capacitor bank fails, each of the second capacitor bank following failed capacitor bank substitutes for the capacitor bank located immediately before the second capacitor bank.

5. The reactive power compensator according to claim 4, wherein a capacitance of each of the capacitor banks included in each of the capacitor bank units is set to a capacitance that starts from the basic capacitance and follows a multiple of the basic capacitance in accordance with a number sequence of 2 to the power of natural numbers.

6. The reactive power compensator according to claim 4, wherein the second capacitor bank includes
   a first switch that is serially connected to a capacitor included in the subbank, and when any one of the capacitor banks fails, changes capacitance of the second capacitor bank by performing switching in accordance with a predetermined selection logic; and
   a second switch that carries out one of connection/disconnection of each of the capacitor banks, based on a signal for connecting the second capacitor bank and the selection logic.

7. The reactive power compensator according to claim 5, wherein the second capacitor bank includes
   a first switch that is serially connected to a capacitor included in the subbank, and when any one of the capacitor banks fails, changes capacitance of the second capacitor bank by performing switching in accordance with a predetermined selection logic; and
   a second switch that carries out one of connection/disconnection of each of the capacitor banks, based on a signal for connecting the second capacitor bank and the selection logic.

8. The reactive power compensator according to claim 6, wherein the second switch includes a thyristor switch.

9. The reactive power compensator according to claim 7, wherein the second switch includes a thyristor switch.

10. A reactive power compensator that includes a capacitor bank unit including a plurality of parallel connected capacitor banks, and compensates reactive power supplied by a power system by combining the capacitor banks, each of the capacitor banks having a capacitance different from other capacitor banks, and controlling connection/disconnection of the capacitor banks stepwisely by a unit of a basic capacitance, wherein
   each of the capacitor bank units is divided into
      a first capacitor bank having a largest capacitance among the capacitor banks, and
      at least one second capacitor bank other than the first capacitor bank,
   the first capacitor bank includes subbanks as many as a number of the second capacitor banks, and a capacitance of each of the subbanks is set to a series of capacitances of the second capacitor banks that starts from the basic capacitance, and
   when any one of the second capacitor banks fails, one of the subbanks having a capacitance equal to a capacitance of failed capacitor bank is selected from the first capacitor bank, and selected capacitor bank substitutes for the failed capacitor bank.

11. The reactive power compensator according to claim 10, wherein the first capacitor bank includes
   a first switch that is serially connected to a capacitor included in the subbank, and when any one of the capacitor banks fails, changes capacitance of the second capacitor bank by performing switching in accordance with a certain selection logic; and
   a second switch that carries out one of connection/disconnection of each of the capacitor banks, based on a signal for connecting the second capacitor bank and the selection logic.

12. The reactive power compensator according to claim 11, wherein the second switch includes a thyristor switch.

13. A reactive power compensator that includes a capacitor bank unit including a plurality of parallel connected capacitor banks, and compensates reactive power supplied by a power system by combining the capacitor banks, each of the capacitor banks having a capacitance different from other capacitor banks, and controlling connection/disconnection of the capacitor banks stepwisely by a unit of a basic capacitance, wherein
   each of the capacitor bank units is divided into
      a first capacitor bank having a largest capacitance among the capacitor banks, and
      at least one second capacitor bank other than the first capacitor bank,
   the first capacitor bank includes subbanks as many as a number of the second capacitor banks, and a capacitance of each of the subbanks is set to a series of capacitances that starts from the basic capacitance and follows a multiple of the basic capacitance in accordance with a number sequence of 2 to the power of natural numbers, and
   when any one of the second capacitor banks fails, one of the subbanks having a capacitance equal to a capacitance of failed capacitor bank is selected from the first capacitor bank, and selected capacitor bank substitutes for the failed capacitor bank.

14. The reactive power compensator according to claim 13, wherein a capacitance of each of the capacitor banks included in each of the capacitor bank units is set to a capacitance that starts from the basic capacitance and follows a multiple of the basic capacitance in accordance with a number sequence of 2 to a power of natural numbers.

15. The reactive power compensator according to claim 13, wherein the first capacitor bank includes
   a first switch that is serially connected to a capacitor included in the subbank, and when any one of the capacitor banks fails, changes capacitance of the second capacitor bank by performing switching in accordance with a certain selection logic; and
   a second switch that carries out one of connection/disconnection of each of the capacitor banks, based on a signal for connecting the second capacitor bank and the selection logic.

16. The reactive power compensator according to claim 14, wherein the first capacitor bank includes
   a first switch that is serially connected to a capacitor included in the subbank, and when any one of the capacitor banks fails, changes capacitance of the second capacitor bank by performing switching in accordance with a certain selection logic; and
   a second switch that carries out one of connection/disconnection of each of the capacitor banks, based on a signal for connecting the second capacitor bank and the selection logic.

17. The reactive power compensator according to claim 15, wherein the second switch includes a thyristor switch.

18. The reactive power compensator according to claim 16, wherein the second switch includes a thyristor switch.

* * * * *